United States Patent [19]

Igel

[11] Patent Number: 4,466,656
[45] Date of Patent: Aug. 21, 1984

[54] LIFTABLE ROOF PANEL ASSEMBLY

[75] Inventor: Richard Igel, Geremering, Fed. Rep. of Germany

[73] Assignee: Webasto-Werk W. Baier GmbH & Co., Gauting, Fed. Rep. of Germany

[21] Appl. No.: 416,160

[22] Filed: Sep. 9, 1982

[30] Foreign Application Priority Data

Sep. 16, 1981 [DE] Fed. Rep. of Germany ....... 3136854

[51] Int. Cl.³ .............................................. B60J 7/08
[52] U.S. Cl. .................................... 296/216; 296/218
[58] Field of Search ........................ 296/218, 216, 224

[56] References Cited

U.S. PATENT DOCUMENTS

| | | | |
|---|---|---|---|
| 4,005,901 | 2/1977 | Lutke | 296/218 |
| 4,067,605 | 1/1978 | Green | 296/218 |
| 4,142,761 | 3/1979 | Lutz | 296/218 |
| 4,216,983 | 8/1980 | Hough | 296/224 |
| 4,257,632 | 3/1981 | De Stepheno | 296/218 |

Primary Examiner—Robert R. Song
Attorney, Agent, or Firm—Antonelli, Terry & Wands

[57] ABSTRACT

A roof panel assembly for vehicles, particularly for retrofitting in vehicles. The roof panel assembly features a lift-up cover which covers an opening in the roof, a frame surrounding the edge of the roof opening and a lifting device connected, on the one hand, to the frame, and, on the other, to the cover, for raising and lowering the rear of the cover panel. To allow a simple change from one type of lifting device to another, the lifting devices are each installable on one of a number of mounting plates, which may be selectively and interchangeably attached to the frame in an easily replaceable manner.

12 Claims, 7 Drawing Figures

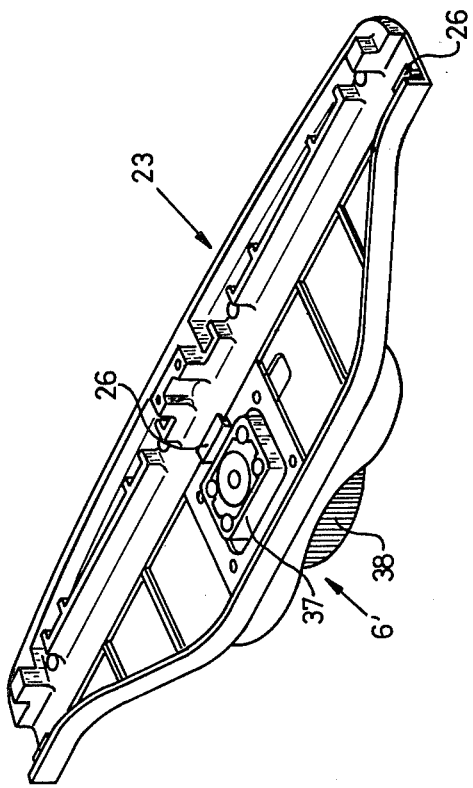

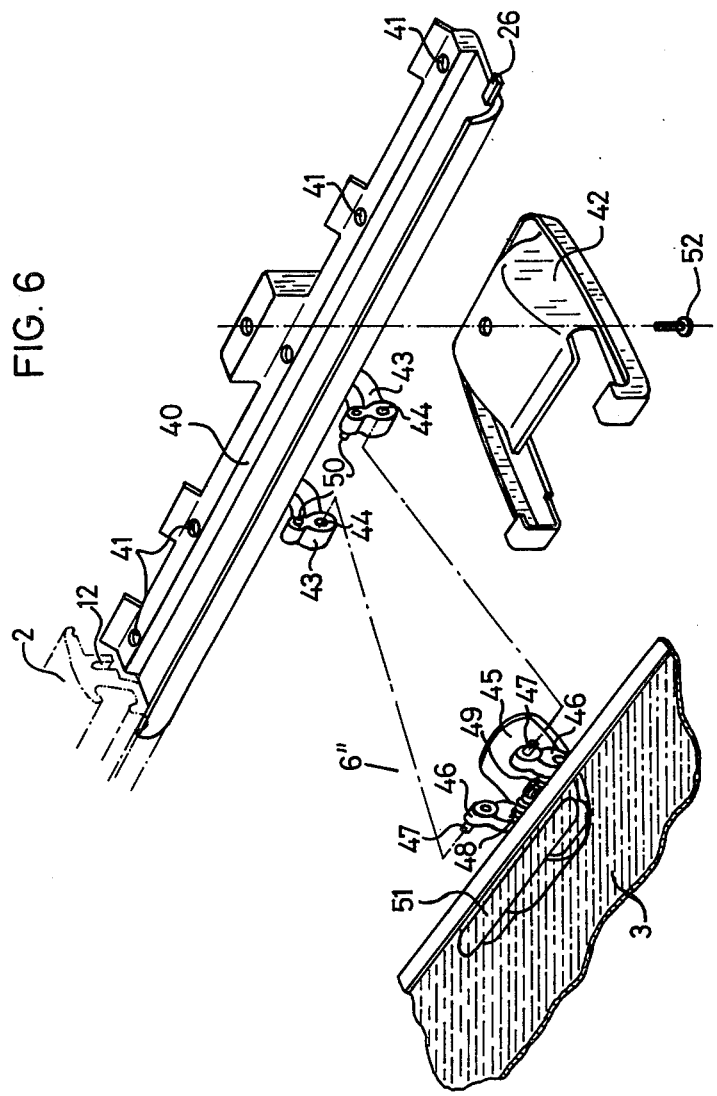

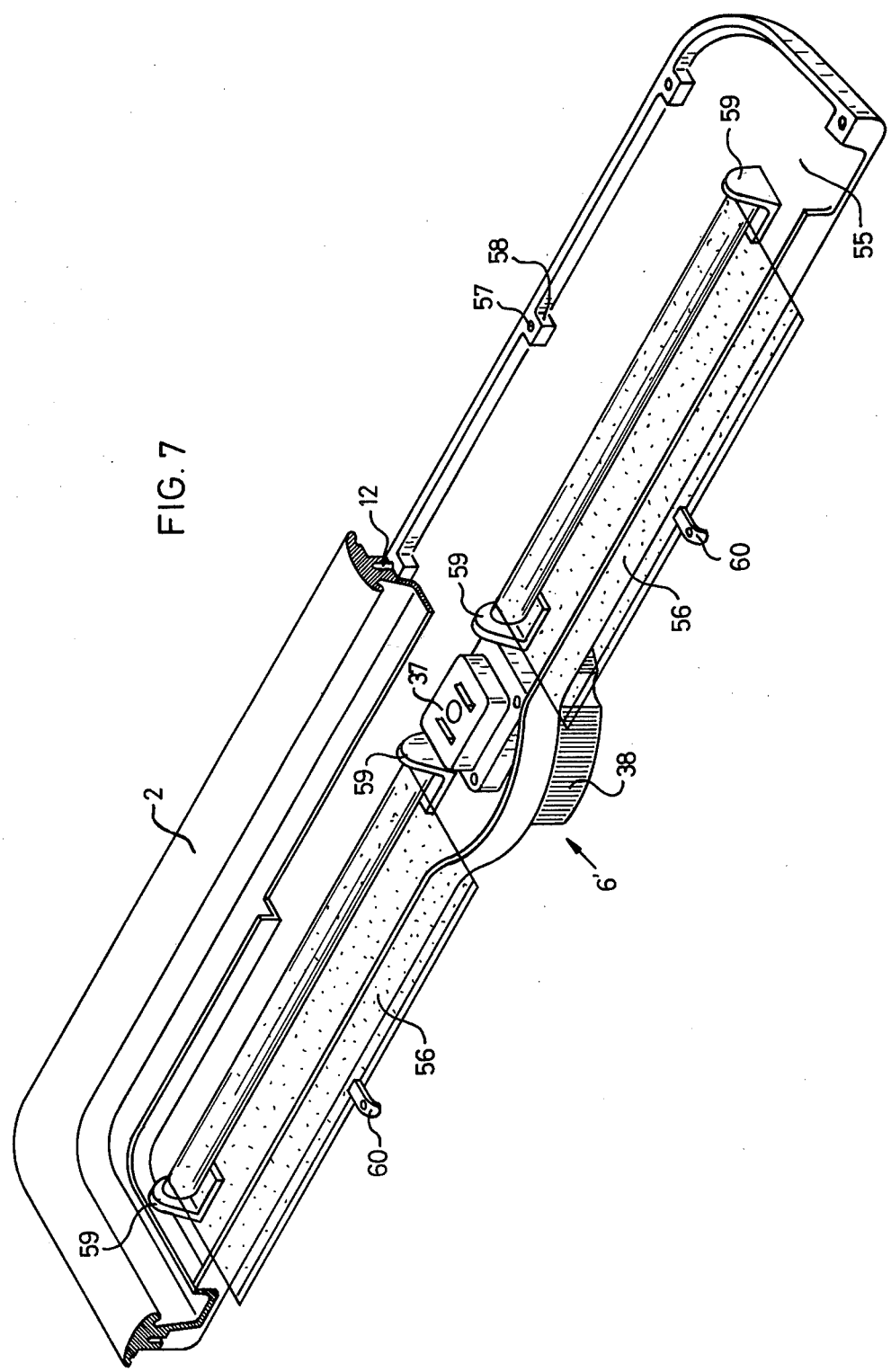

LIFTABLE ROOF PANEL ASSEMBLY

BACKGROUND AND SUMMARY OF THE INVENTION

The invention concerns a liftable roof panel assembly for vehicles, particularly for retrofitting in such vehicles, having a hook-out, removable cover panel installed over the area of a roof opening, a frame surrounding the edge of the roof opening and a lifting device connected, on the one hand, to the frame and, on the other, to the cover panel for raising and lowering of a rear portion of the cover panel.

Roof assemblies of this type are known (U.S. Pat. No. 4,067,605). The lifting devices can be designed in various ways, and they can be operated either by a revolving handle (U.S. Pat. No. 4,142,761 and commonly assigned U.S. application Ser. No. 170,184, filed July 18, 1980), a hinged handle (U.S. Pat. No. 4,005,901) or a motor, specifically an electric motor. However, until now it was not possible to replace one type of lifting device with another according to the customer's wish without appropriate structural changes, particularly in the frame profile.

Thus, a primary object of the present invention is to design a roof assembly of the above-mentioned type which would allow an easy change-over from one type of lifting device to another in compliance with customer's wishes.

This object is achieved in accordance with preferred embodiments of the present invention by installing each of the lifting devices on one of a number of mounting plates which may be selectively and interchangeably attached to the frame in an easy replaceable manner. Accordingly, it, thus, becomes possible to manufacture and keep in stock a basic roof panel assembly without an attached lifting device, the lifting device being installed later in accordance with the customers' choice from the range of available types. Thus, manufacture and stocking becomes more efficient while, at the same time, customers are able to choose among various lifting devices.

The replaceable mounting plate may be fitted, in accordance with the present invention, with a lifting device which is operated manually by a revolving or hinged handle, or with one which can be power-operated, specifically by means of an electric motor. On the replaceable mounting plate, additional devices can also be installed, such as sun shades which, when a cover of translucent or transparent material is used, makes it possible to reduce the intensity of the incident light.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 5 is a replaceable mounting plate with a telescopic hoist operated manually by a revolving handle;

FIG. 6 is a perspective, expanded drawing of a replaceable mounting plate with a hinged handle; and FIG. 7 is a rear area of a frame with an attached mounting plate which holds two sun shades in addition to a manually-operated telescopic hoist.

DETAILED DESCRIPTION OF THE PREFERRED EMBODIMENT

Figure 1:
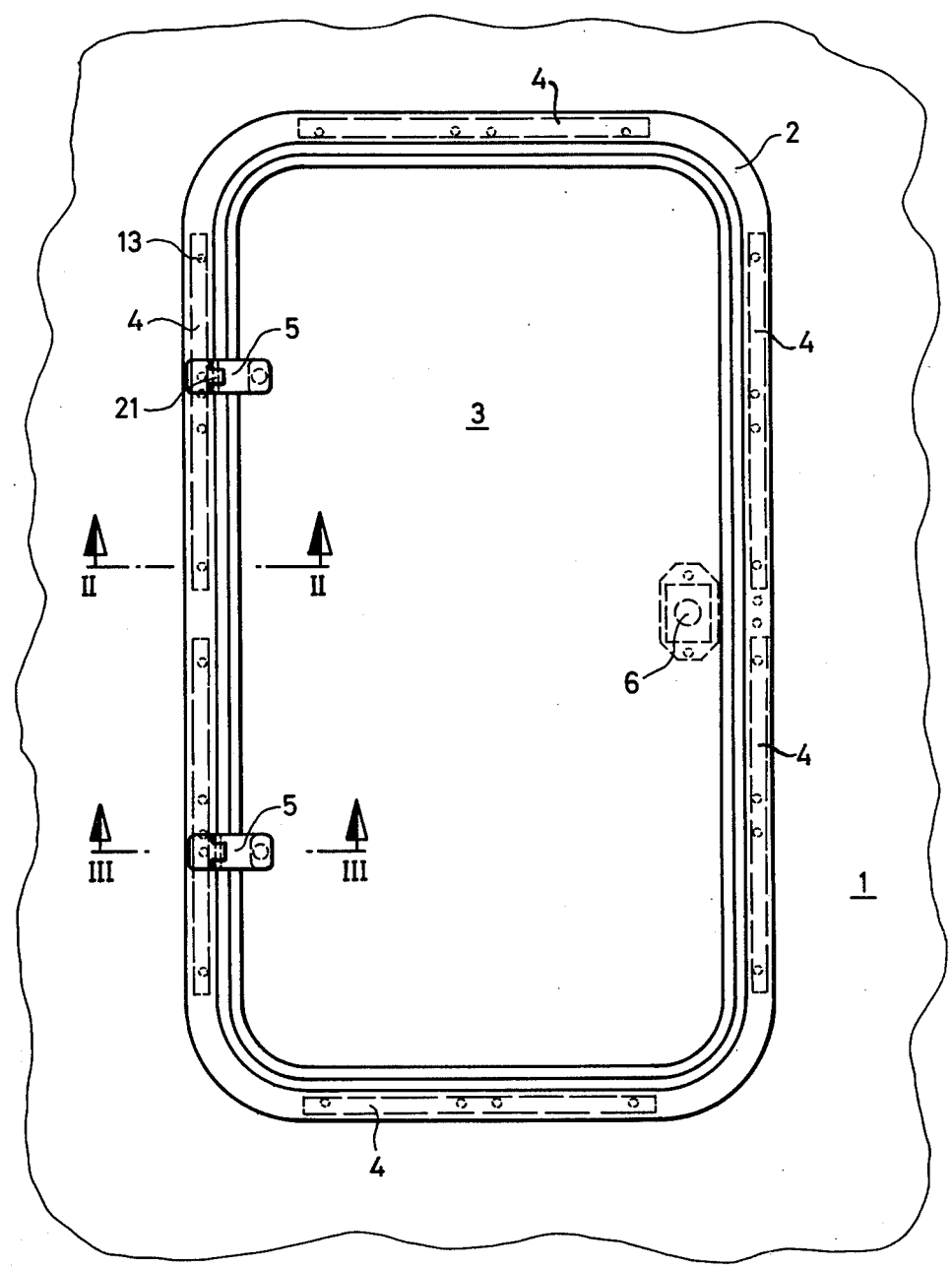
FIG. 1 is a top view of a roof panel assembly in accordance with the invention.

With reference to FIG. 1, an opening is cut into the solid roof 1 of a vehicle body, and this opening is surrounded by a frame 2. Frame 2 supports a cover panel 3 made, for example, of acrylic glass or metal. Frame 2 is attached to vehicle roof 1 by V-shaped, sheet metal attachment pieces 4. Cover panel 3 is hinged by two hinges 5 to a front portion of the frame 2 so that the cover panel 3 can swing about an axis which lies in the proximity of the front edge and parallel thereto. Schematically depicted lifting device 6 is used for raising and lowering the rear portion of the cover panel 3.

Figure 2:
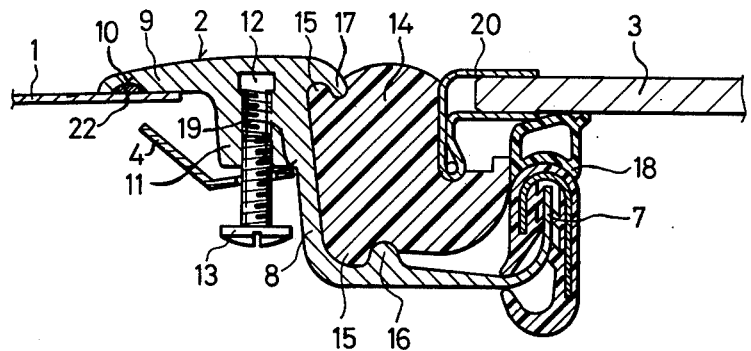
FIG. 2 is a section along Line II—II of FIG. 1.

The cross section of frame 2, which is preferably made of light metal, for example, aluminum, is approximately a U-profile. An inside leg 7 of the U-profile is shorter than an outside leg 8, and a flange 9 overlies the edge area of the roof panel 1, which defines the opening for cover panel 3. A seal 22 is inserted in a slot 10 of flange 9. In a transition area between outside leg 8 and flange 9, a block 11 with a groove 12 is provided. Screws 13, of the so-called self-cutting type, cut threads in groove 12 as they are threaded into block 11. Screw 13 passes through a slot in the V-shaped, sheet metal attachment piece 4. In the view of FIG. 2, screw 13 is threaded into groove 12 just far enough to be held securely. Consequently, the free side of sheet metal attachment piece 4 can swing toward the side of block 11. In this position the sheet metal attachment piece 4, frame 2 can be inserted in the roof opening from the top. This form of frame mounting construction is described in commonly assigned U.S. patent application Ser. No. 338,621, filed June 15, 1982, which application is incorporated herein by reference.

Cover 3 features edge 20 which rests on seal 14, which is inserted in the U-profile of frame 2 and extends with its bead 15 between two projections 16 and 17, so that a solid contact is established. Furthermore, cover 3 is sealed against frame 2 by seal 18 resting on U-profile edge 7.

Figure 3:
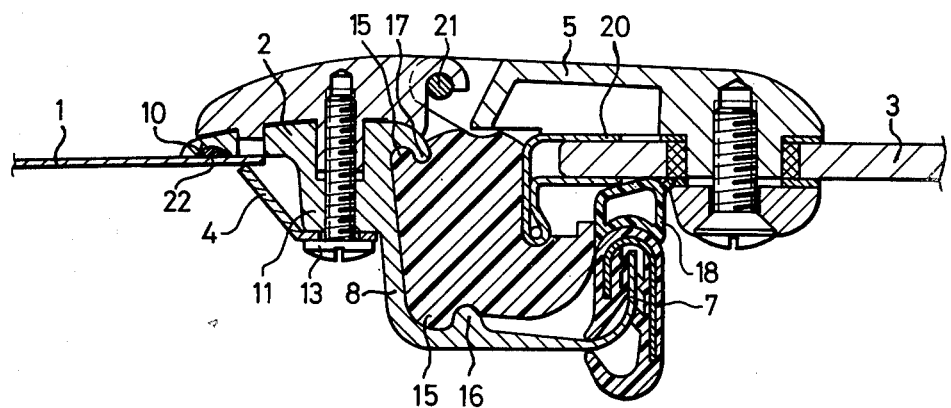
FIG. 3 is a section along Line III—III of FIG. 1.

Hinge 5 (FIG. 3) consists of two parts which can swivel relative to each other around pin 21 and are bolted, on the one hand, to flange 9 of frame 2 and, on the other, to cover 3. In FIG. 3, screw 13 is completely threaded in, and sheet metal attachment piece 4 touches point 19 in the corner between block 11 and U-profile leg 8. When screw 13 is threaded in, sheet metal attachment piece 4 swivels around point 19 and, as a result, the free side of the attachment piece moves toward roof panel 1. By tightening screw 13, the contact pressure of frame 2 against roof panel 1 can be adjusted.

Figure 4:
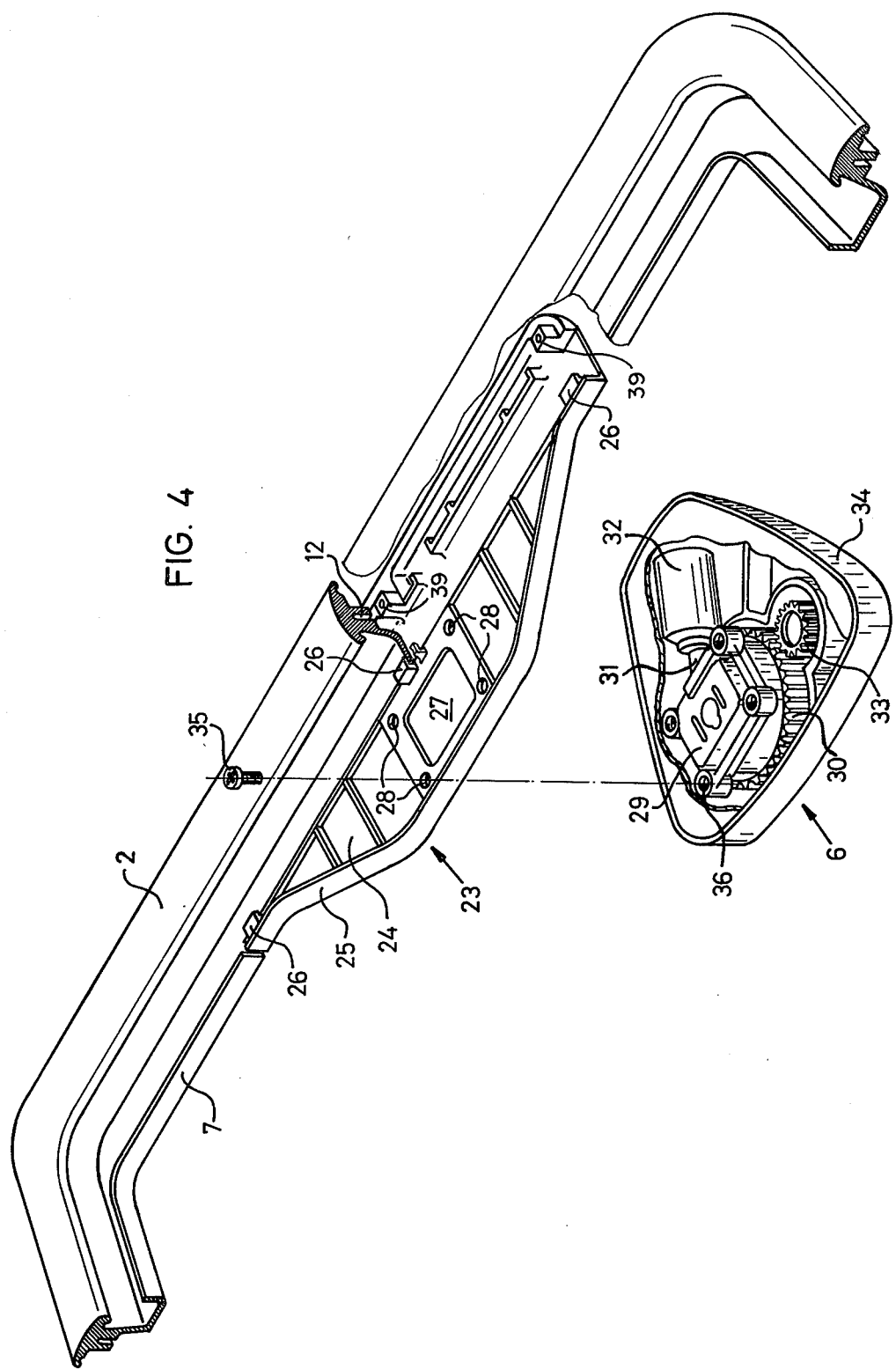
FIG. 4 is a perspective view of a rear frame section with a mounting plate for an electric motor-operated (telescopic) hoist.

As FIG. 4 shows, in the rear center area of frame 2, U-profile leg 7, as well as the part of the bottom of the U-profile which borders it, are omitted, forming a cutout or elongated notch therein. Instead, in this area, mounting plate 23 is connected to the frame in a fashion which allows easy removal of the plate. For this purpose, respective ones of the screws 13 extend, from beneath mounting plate 23, through the mounting plate holes 39 and into groove 12 of frame 2. At the same time, the mounting plate 23 extends under frame 2 and, with its bottom surface 24 and its high edge 25, substitutes for the omitted portion of the bottom of the U-profile and its side leg 7.

Catches 26 project from both sides and from the central portion of mounting plate 23. Catches 26 are slid onto the remaining portion of the bottom of the U-profile of frame 2 prior to securing of the screws, through holes 39 into slot 12, and thereby ensure a firmer holding of the mounting plate. Catches 26 also allow complete absorption of the forces which develop when cover 3 is opened.

Bottom 24 of mounting plate 23 is provided with an opening 27 and four holes 28. Opening 27 provides room for the passage of telescopic hoist 29 which is part of the lifting device designated as 6. The telescopic hoist can be designed in the manner which is known from said U.S. Pat. No. 4,142,761 or Ser. No. 170,184, and thus no detailed explanation is necessary, these disclosures being incorporated by reference herein. The upper end of the hoist is connected to the rear end of cover 3 and is easily detachable, a feature which is also known from U.S. Pat. No. 4,142,761 and Ser. No. 170,184. Telescopic hoist 29 features a part which is secured against axial shifting, on which ring gear 30, meshed with a worm gear on driveshaft 31 of electric motor 32, is mounted. As an auxiliary provision, ring gear 30 can be turned by pinion 33, which is connected to a detachable hand crank, to thus ensure emergency operation in case of failure of electric motor 32 or a lack of electric current supply for it. Lifting device 6, accommodated in dish-shaped housing 34, is held in place on the underside of mounting plate 23 by screws 35 which pass through holes 28 and are threaded into holes 36 tapped in the housing of lifting device 6.

In FIG. 5, mounting plate 23 is identical to that shown in the embodiment of FIG. 4. However, in this case, mounting plate 23 holds a telescopic hoist 37 which is a part of lifting device 6' and can be operated manually by revolving handle 38. Device 6' is of a known construction per se and the incorporated disclosures should be referred to regarding details of the specific construction of telescopic hoist 37 and its detachable connection to cover panel 3.

FIG. 6 shows a second replaceable mounting plate 40 which is interchangeably mountable to frame 2 instead of mounting plate 23 without modification to frame 2. Like mounting plate 23, mounting plate 40 features holes 41 (corresponding to holes 37), into which screws (not shown) are inserted and, like screws 13, are threaded into groove 12 of frame 2. The mounting plate 40 is also provided with catches 26 for additional support. However, in contrast to rearwardly extending catches 26 of the FIG. 4 embodiment, which can be slid onto the remaining portion of the cut-out part of frame 2, the catches 26 of this embodiment extend parallel to the rear edge section of frame 2. Thus, these catches 26 must be hooked onto the bottom surface of the U-profile adjacent to the cut-out and mounting plate prior to fastening of the screws through holes 41.

Attached under mounting plate 40 by screws 52 is handle shell 42. Two bearing arms or brackets 43 project, from mounting plate 40, inwardly toward the roof opening, and have holes 44 which establish the swivel axis of hinged handle 45 of lifting device 6". Hinged handle 45 features two hook-out levers 46 with sideways-pointing pins 47. Hook-out levers 46 slide axially on swivel pin 48 of hinged handle 45. They can be axially adjusted against the tension of a spring 49 carried on swivel pin 48, so that pins 47 can either be engaged with or disengaged from holes 44 in bearing arms 43. Furthermore, bearing arms 43 have ball catches 50 which fit, under spring tension, inside side recesses in hook-out lever 46, thus holding hinged handle 45 in the lifted-up position of the cover panel. Hinged handle 45 is linked to cover 3, as schematically shown at 51. As far as the construction and function of the hinged handle are concerned, these are common knowledge (U.S. Pat. No. 4,005,901) so that further explanations are unnecessary.

Finally, in FIG. 7, a third replaceable mounting plate 55 is shown which is interchangeably usable instead of either of mounting plates 23 or 40 without modification to frame 2, and features, as additional equipment, besides the telescopic hoist 37 shown in FIG. 5 and operated by revolving handle 38, a passenger convenience item such as two sun shades 56. Mounting plate 55 is installed under frame 2, and, like mounting plates 23 and 40, mounting plate 55 is attached by screws to frame 2. The screws provided for this purpose are inserted in holes 57 in eyes 58 of mounting plate 55, and, like screws 13, are threaded into groove 12 of frame 2. However, since mounting plate 55 extends around to the longitudinally-directed portions of frame 2 and is secured thereto by the screws passing through holes 57 situated at these portions (only one of which is shown), no catches equivalent to catches 26 are necessary. In fact, the cut-out in frame 2, used with mounting plates 23, 40, becomes superfluous when mounting plate 55 is used. Shades 26 are held in position on mounting plate 55 by bearing supports 59. At a front portion of each of the shades, a grip 60 is provided for pulling out the respective shade against the tension of a spring to reduce the intensity of the incident light penetrating through cover 3, when it is formed of a clear or transparent material.

It is understood that the use of replaceable mounting plates is not limited to use in roof panel assemblies intended for retrofitting, but is usable with respect to original equipment assemblies for reducing manufacturer inventory costs and/or facilitating dealer modifications to original equipment roof panel assemblies.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Liftable roof panel assembly for vehicles of the type having a cover for closing the area of a roof opening, a frame for perimetrically surrounding the edge of the roof opening and a lifting device, said lifting device being connected to the frame and to the cover for raising and lowering of a rear portion of the cover, wherein the lifting device is one of a plurality of different types of lifting devices that are selectively and interchangeably mountable to said frame, and is installed on a mounting plate which, in turn, is attached to the frame in a manner which allows easy replacement of said mounting plate.

2. Liftable roof panel assembly according to claim 1, wherein the replaceable mounting plate supports a lifting device operated by a revolving handle.

3. Liftable roof panel assembly according to claim 1, wherein the replaceable mounting plate supports a lifting device operated by a hinged handle.

4. Liftable roof panel assembly according to claim 1, wherein the replaceable mounting plate supports an electric power-operated lifting device.

5. Liftable roof panel assembly according to claim 1 or 2 or 3 or 4, wherein the replaceable mounting plate additionally carries at least one sun shade.

6. Liftable roof panel assembly according to claim 1 or 2 or 3 or 4, wherein the replaceable mounting plate extends beneath said frame and has catches for supporting the mounting plate on an upper side of the frame.

7. Liftable roof panel assembly according to claim 1, wherein a plurality of differently configured replaceable mounting plates are provided for mounting of said lifting devices, each type of said lifting devices being installed on said frame by at least a respective one of said mounting plates.

8. Liftable roof panel assembly according to claim 7, wherein said frame for perimetrically surrounding the roof opening has a generally U-shaped cross-sectional profile, and wherein one leg and part of a bottom portion of the U-shaped profile adjacent said one leg have been omitted in a manner creating an elongated notch in a rear center area of said frame for receiving at least one of mounting plates.

9. Liftable roof panel assembly according to claim 7 or 8, wherein one of said plurality of mounting plates is constructed for mounting of a telescopic lifting device and a second one of said mounting plates is constructed for connection with a hinged handle lifting device.

10. Liftable roof panel assembly according to claim 9, wherein a third one of said mounting devices is provided with a passenger convenience item in addition to a lifting device.

11. Liftable roof panel assembly according to claim 10, wherein said passenger convenience item comprises sun shades.

12. Liftable roof panel assembly according to claim 11, wherein the mounting plate provided with sun shades is constructed to mount to the frame in a manner underlying a portion of said frame which extends along a rear border and two lateral border portions of the roof opening.

* * * * *